Feb. 4, 1964     F. STÜBBE ETAL     3,120,039
DIE MOLD CLOSURE MECHANISM FOR DIE CASTING
AND INJECTION MOLDING MACHINES
Filed July 28, 1960
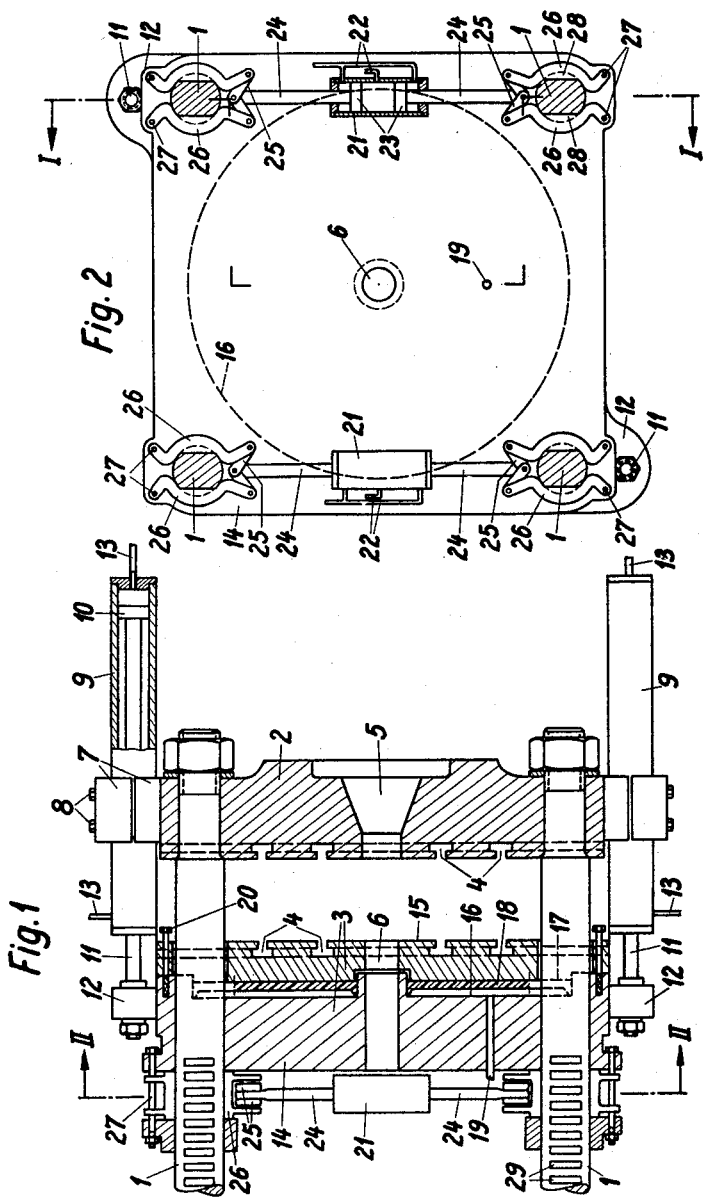
Inventors
FRIEDRICH STÜBBE and RUDOLF BREHER
By
ATTORNEY 3,120,039
DIE MOLD CLOSURE MECHANISM FOR DIE CASTING AND INJECTION MOLDING MACHINES
Friedrich Stübbe, Vlotho (Weser), and Rudolf Breher, Hausberge an der Porta, Germany, assignors to Maschinenfabrik Albert Stubbe, Vlotho (Weser), Germany, a German company
Filed July 28, 1960, Ser. No. 45,966
Claims priority, application Germany Aug. 6, 1959
6 Claims. (Cl. 22—68)

The present invention relates to die mold closure mechanisms, particularly for die casting or injection molding machines in which the two halves of the die or mold are supported, in confronting and registering relationship on a pair of platens, one of which is spatially fixed and the other movable relative thereto.

As is well known in making castings on such machines, each of the platens is provided with appropriate means, for example, T-slots receiving the heads of bolts which support the respective half of the die mold. After the die halves have been mounted securely on the platens confronting each other, the movable platen is moved towards the spatially fixed platen so that the two die halves are tightly closed on each other to form the cavity into which the casting material is caused to flow. During the injection of the casting material thereinto, the halves must be pressed tightly against each other and such high pressure maintained so that under the high pressure of the injected material the die mold halves are tightly closed on each other. When casting is completed, the injected material is permitted to cool, and upon solidification, certainly of the external surface regions of the casting, the mold closure mechanism is actuated to move the movable platen in the opposite direction thus separating the mold halves a sufficient distance to permit removal of the casting. As appears obvious, the closure mechanism must not only permit closing and opening of the mold but must also generate a very high and sustained closure force during the whole time the mold is closed.

When the die mold, so supported, is closed the two supporting platens are spaced a first distance from each other which depends on the size of the mold for the casting to be made. This first distance between the platens is hereinafter designated the "mold insert distance." When the die mold, so supported, is opened, the two platens are spaced a distance from each other, which distance is obviously controlled by the distance to which the two mold halves must be separated to permit removal of the casting, and hence depends on the size of the casting. Hence the distance through which the movable, mold supporting, platen must be moved from the fixed platen, that is, from the closed to the open position of the platen mounted mold, is hereinafter designated the "mold opening distance."

For economic reasons, cost as well as material, die molds are not made any larger than is required by the size of the casting to be produced. It follows that die mold closure mechanisms must meet the requirements that the mold insert distance be variable and have a mold opening distance sufficiently large for the maximum mold insert distance of which it is capable. In prior art mold closure mechanisms, these requirements are either met but partially or are met at great expense.

It is thus an object of the present invention to provide a mold closure mechanism which meets the immediately above stated requirements with a relatively simple structure, economical of material and labor outlay in its manufacture, and is adjustable to different magnitudes of both the mold insert and mold opening distances in simple manner.

We will now describe some prior art closure mechanisms more clearly to detail certain features of the present invention and the disadvantages overcome thereby. One prior known machine has four parallel shafts or rods, arranged rectangularly relative to each other, affixed at their forward ends to a mold mounting platen, which, in turn, is spatially affixed to the frame of the machine. At their opposite and back ends, these shafts are attached to a powerful, heavy abuttment or thrust plate supported in the frame of the machine longitudinally movable along the shafts for reasons which follow. A second mold mounting platen is positioned between the first mentioned platen and the thrust plate. Between this movable mold supporting platen and the thrust plate there is disposed a heavy toggle which moves the movable platen back and forth when opening, respectively closing, the die mold and produces the high closure pressure. Variable mold insert distances are obtained by threading the back end of the shafts to an appropriate length so that the thrust plate, movable on the frame of the machine as stated, may be moved in either direction on the shafts and may be locked thereto by nut means. Such mold closure mechanism has the disadvantage that adjustment of the mold insert distance is relatively time consuming, difficult and complicated. The heavy thrust plate must be slid uniformly and evenly on all four shafts to prevent unequal tension demands on the shafts when producing the closure pressure and to prevent tilting of the movable mold supporting platen, as also shifting of the mold halves. In that the movable mold supporting platen can be moved in neither direction over the threaded portion of the shafts, a further disadvantage thereof resides in that, for a short threading of the shafts, the mold insert distance can be but slightly varied, while for a long threading, the mold opening distance is shortened. To obtain greater adjustability and flexibility of the mold insert distance and the largest mold opening distance corresponding thereto, a very long set of shafts with long threaded portions for the thrust plate, must be used so that the machine is of excessive length, a large expenditure of material is required, and the mechanism is unduly expensive. In addition, the mold opening distance being determined by the length of the toggle lever, a very long and expensive toggle must be used.

In another prior art machine, the thrust plate is affixed to the rearward portions of the shafts, which are unthreaded. An additional pressure platen is disposed between the movable mold mounting platen and the thrust plate, and is movable on the shafts. A toggle lever is disposed between the thrust plate and the pressure platen. The pressure platen is connected to the movable mold mounting platen by a sleeve and a threaded member. By screwing the threaded member into the sleeve, the distance between the pressure platen and the movable mold mounting platen can be altered thereby adjusting the mold insert distance. This type of mold closure mechanism has the disadvantage that greater adjustability of the mold insert distance is obtainable only with a very long sleeve, thus making the length both of the shafts and of the machine very large. With a large mold insert distance, a correspondingly larger mold opening distance requires a very long toggle lever, which further increases the lengths of the shafts and the machine. Hence this prior art machine also requires a relatively high investment in material and cost.

In still another prior known machine, there is disposed between the thrust plate and the movable mold mounting platen a hydraulic cylinder which moves the movable mounting platen by a piston when opening and closing the mold, the cylinder and piston producing the closure power during the casting operation. If the mold insert distance is to be adjustable over a wide range, the cylinder must be of corresponding length, which likewise increases the lengths of the shafts and of the machine. The mold opening distance, required for the largest mold insert distances, requires a correspondingly long piston rod, with the result that the necessary lengths of the cylinder, shafts and machine, are again increased. Hence this type of mold closure mechanism also involves a relatively high outlay of material and labor. When the hydraulic cylinder is operated at a liquid pressure, which for technical and economic reasons, does not exceed the commonly employed pressures, a cylinder of correspondingly larger cross-section must be used to enable production of the required high closure force. This mold closure mechanism thus has the further disadvantage that a long cylinder of large cross-section is required, which, due to high machining costs, is relatively expensive. Furthermore, for such large filling quantities, correspondingly larger pumps are required. If the diameter of the cylinder were to be decreased to lower the manufacturing cost and to decrease the quantity of liquid to be pumped for each piston stroke, a higher pressure of the liquid would be required for the production of which complicated and expensive pumps would be necessary. Furthermore, because of the higher pressures, very expensive piping and valving would be required. The long shafts of the above described machines, on application of the closure pressure, are subjected to relatively large stretching in that, as well known, the amount of stretch is proportional to the length of the shafts.

Hence, as above stated, the instant invention has as its object the elimination and avoidance of the above discussed disadvantages and to provide a mold closure mechanism meeting the requirements of ready adjustability of the mold insert distance and of the mold opening distance over a wide range, thereby rendering possible the shortening of the overall length of the machine and thus reducing the outlay of materials, the manufacturing cost, and the spatial requirements of the machine.

We accomplish the foregoing in accordance with the present invention primarily by attaching a piston rod to one of the two mold mounting platens of which rod the piston slides in a cylinder in the direction of movement of the movable mold mounting platen. The cylinder is attached to the other mold mounting platen and, on opening its attaching means, is itself movable in the direction of its longitudinal axis relative to and along the mold mounting platen to which it is attached. The cylinder is positioned laterally and externally of the space provided between the two mold supporting platens. To vary the mold insert distance, the attaching means of the cylinder is loosened, the cylinder moved in one or the other direction axially, and the attaching means retightened. In this manner, it becomes possible for the movable mold mounting platen to move, for every position of the cylinder, through the maximum mold opening distance. This is because for every axially displaced position of the cylinder, the piston can execute a complete stroke as determined by the length of the cylinder. In that the cylinder may be moved relative to the mold mounting platen to which it is attached, it is further possible to determine the length of the cylinder solely from the desired maximum mold insert distance. The cylinder length is thus not increased, as it is in the prior known mechanisms, by the mold opening distance required for the largest mold insert distance. Hence the cylinder and piston of a structure of the present invention for a predetermined maximum mold insert distance, are given the minimum possible length and can be made at a minimum expenditure of material and labor. Because each, the piston and the cylinder, are attached to both mold mounting platens respectively, there results the further appreciable advantage that the length of the mold closure mechanism is controlled only by the maximum mold insert distance desired. There is thus eliminated in the present structure the additional length of the mold closure mechanism which, in prior machines, is caused by the length either of the toggle lever or of the hydraulic cylinder. Hence the present mechanism is of appreciably lesser length, resulting not only in decreased spatial requirements for our machine, but also in the use of less material therein and a lower production cost. Because the piston and cylinder are connected to both mold mounting platens, no thrust plates or pressure platens are required, resulting in further material and cost savings. Where the movable mold mounting platen is supported on shafts or rods, as are the above described prior known machines, one end of such shafts may be attached to the spatially fixed mold mounting platen, while to support the other shaft ends but a light bearing plate is required which need withstand no compressive or tensile forces. Further simplification of the machine is possible in that the bearing plate need not be rigidly attached to the shaft but may be attached to the frame of the machine. The shafts can then be freely supported with their ends loosely in bores in the bearing plate so that the ends may slidingly move when the shafts expand. Corresponding to the above mentioned, appreciably shorter over-all length of the machine, the shafts are likewise appreciably shorter whereby the resultant extension or distention of the shafts during application of the closure pressure is appreciably decreased. When the required mold insert distance varies but slightly on interchanging one mold for another, the cylinder obviously need not be adjusted in its attaching means in the described embodiment of the present invention. Instead of the single cylinder described, several cylinders of correspondingly smaller cross-section may be used in embodiments of the present invention. Where the movable mold mounting platen is supported on a plurality of shafts, the use of a plurality of cylinders, as just mentioned, has the advantage that by a uniform distribution of the cylinders bending moments in the shafts and in the mold mounting platens are avoided.

It is another object of the present invention to provide a mold closure mechanism, wherein firstly, the movable mold carrier or platen may be locked at a spatially fixed region of the machine by clamping means, and, secondly, one of the two mold carriers or platens consists of two discs of which one disc serves as a platen on which one of the mold halves is mounted and the other disc is connected to the other mold carrier or platen by the above mentioned cylinder, piston rod and piston, the first mentioned disc being provided with a recess functioning as a short pressure cylinder of large cross-section in which a projection, integral with the other disc and functioning as a piston, glides. In such arrangement, the cylinder and the piston, connected to the respective mold mounting platens as stated, serve primarily to close and open the die mold, for which purpose but a relatively weak force is required, permitting of a weak and cheap construction of the piston and cylinder. The high closure force is produced by the pressure cylinder formed by the two discs of the one mold mounting platen. In that for this purpose but a short stroke is required, the pressure cylinder may be, and is, formed by a cylindrical recess of but slight depth in the one disc and a piston-like projection of but slight height on the other disc, so that the surfaces which slide on each other, and require accurate machining, are but very small, thereby further simplifying the mold closure mechanism and rendering it relatively inexpensive. The mold mounting platens being of large cross-section, the recess and the projection of the discs comprising the one mold mounting platen can readily be made of large cross-section so as readily to develop the necessary high closure force in the pressure cylinder by a relatively small liquid pressure. In that the force of the reaction, corresponding to the closure force produced in the pressure cylinder, cannot be taken up by the cylinder which opens and closes the die mold, the movable mold mounting platen is locked in position by a locking device after the mold is closed. Where the movable mold supporting platen is supported on shafts, the locking means may preferably and advantageously engage the supporting shafts.

With these and other objects in view, which will become apparent in the following detailed description, the present invention will be clearly understood in connection with the accompanying drawing, in which:

FIGURE 1 is a longitudinal section of the die mold closure mechanism along the lines I—I of FIG. 2; and FIG. 2 a cross-section along the lines II—II of FIG. 1.

Referring now to the drawing, four support shaft 1 are supported in the frame of a casting or molding machine, not shown, and are affixed at one end to a mold mounting or carrier platen or member 2, the latter being also supported in the not shown frame, and in spatially fixed position. Shafts 1 also support another mold mounting platen 3 which, however, is movable longitudinally on the support shafts. The facing surfaces of both mold mounting platens, 2 and 3, are provided with a plurality of slots 4 for receiving the heads of bolts to which the respective halves of a casting mold or die, not shown, may be attached in known manner. Mold mounting platen 2 has a formed bore 5, preferably central thereof as shown, to one end of which the injection aperture of the die mold connects and to the other end of which an injection nozzle may be approached and connected. Mold mounting platen 3 is provided with a bore 6 for housing an ejector, not shown, for ejecting the casting from the opened die mold after its completion. The die mold carrier platens 2 and 3 are preferably of rectangular or square transverse section as shown, and at each of two diametrically or diagonally opposite corner regions the mold carrier platen 2 is provided with a clamp 7 which, by means of screws 8, functions to attach a cylinder 9 to platen 2 with the axis of the cylinder parallel to the direction along which platen 3 moves. On easing up screws 8, each cylinder 9 may be displaced relative to platen 2 longitudinally along its axis. Within each hydraulic cylinder 9 an individual piston 10 glides in the direction of the movable carrier platen 3, of which the piston rod 11 is anchored by an apertured boss 12 to carrier platen 3. The mold insert distance is adjusted by shifting cylinders 9 axially in their attaching means 7.

On actuation of hydraulic cylinders 9, movable mold carrier platen 3 is shifted on shafts 1 and piston 10, in accordance with the desired mold opening distance, executes a longer or a shorter stroke. Operation of hydraulic cylinders 9 is effected by water or oil under pressure admitted to, or outflowing from, either side of piston 10 by piping 13.

Mold carrier platen 3 consists of two discs 14 and 15 of which disc 14 is guided on shafts 1 and carries apertured bosses 12 in which piston rods 11 are anchored as stated. Disc 15 is provided with the above mentioned T-slots 4 for mounting thereon one die mold half. Disc 14 is provided with a recess 16 in the form of a pressure cylinder of short length and large cross-section. A projection 17 of disc 15 moves in recess 16, and in front of projection 17 there is positioned a self-sealing member 18 which abuts on the cylindrical surface of recess 16. liquid piping 19 supplies and drains water or oil under pressure into and from the region of recess 16 sealed off by elastic plate or diaphragm 18. The liquid under pressure in such region produces the closure force on the closed mold by way of plate 18 and disc 15. Bolts 20, threaded into disc 14 and passing through bores in disc 15, are of a length exceeding the width of disc 15 and permit limited axial movement of disc 15 from disc 14. These bolts also prevent any accidental movement of projection 17 too far out of recess 16 and hence any dropping of disc 15 away from disc 14.

Assuming the mold halves have ejected a previously completed casting, a control system actuates valving in piping 13 to admit liquid under pressure to cylinder 9 in such direction as to move platen 3, by way of piston 10, toward platen 2 to close the mold halves on each other. After the mold has been closed but before any closure force is produced, the movable mold platen 3 is locked in position on shafts 1 by a locking arrangement including two hydraulic cylinders 21 provided with hydraulic lines 22 for supplying, or draining off, oil or water under pressure. Each cylinder 21 has two pistons 23 of which the piston rods are connected to individual toggle levers 25 which, in turn, are connected to one end of a clamping jaw 26 of which the other end is pivotally supported on stud 27 in disc 14. Clamping jaws 26 are provided with ribs by means of which they can engage spaced circumferential grooves 29 in shafts 1. To lock movable platen 3 to shafts 1, jaws 26 are closed by toggle levers 25 which are actuated by piston rods 24 and pistons 23 of cylinder 21 in obvious manner. The mold having been closed, valving in lines 22 admits liquid under pressure to cylinders 21 to move pistons 23 in such direction as to lock jaws 26 to shafts 1. With the jaws so locked, the injection nozzle flows casting material into the mold cavity while simultaneously valving in piping 19 admits liquid under pressure to the sealed off region of recess 16, thus producing the high closure pressure.

While we have disclosed one embodiment of the present invention, it is to be understood that this embodiment is given by example only and not in a limiting sense, the scope of the present invention being determined by the objects and the claims.

What we claim is:

1. A die mold closure mechanism for locking and unlocking the two complementary portions of a mold in registering relationship comprising a plurality of spaced parallel shafts, a first platen spatially fixed on said shafts, a second platen consisting of a first and second disc coaxial with each other and said first platen and movable on said shafts axially toward and away from said first platen, means for attaching to each of the mutually facing surfaces of said first platen and of the first disc one mold portion of a pair of complementary mold portions, means for moving said second platen towards and away from said first platen to close said mold portions upon each other and to separate them from each other, said second platen moving means interconnecting said first and second platens at a region of each of said platens external to and laterally of the region of said first platen and said first disc facing surfaces for attaching said mold portions, a projection from the surface of said first disc facing said second disc, a recess in the surface of said second disc facing said first disc in which said projection slidingly fits, an elastic member sealing the recess region between the end face of said projection and the bottom of said recess, means for locking said second disc to the shafts and actuable when said mold portions are closed upon each other on movement of said second platen a predetermined distance toward said first platen, and means for applying pressure to the sealed off recess region when said second disc is so locked and for relieving the pressure in the sealed off recess region when the locking means are in the condition of release of said second disc from said shafts.

2. A mold closure mechanism for locking and unlocking two complementary portions of a mold in registering relationship, comprising a plurality of uniformly spaced shafts, a first platen spatially fixed on said shafts, a first and a second disc coaxial with each other and said first platen movable on said shafts towards and away from each other and towards and away from said first platen, the facing surfaces of said discs being telescopable to a limited extent one within the other, an elastic cup-shaped diaphragm interposed between said facing telescopable surfaces of said discs, means for affixing to each of said facing surfaces of said first platen and said second disc one of said two complementary portions of said mold, means for moving said first and second discs towards and away from said fixed platen to close said mold portions on each other, said moving means comprising at least one piston and a cooperating cylinder affixed to said first disc and the fixed platen, respectively, the cylinder being adjustably affixed to permit its adjustment in the direction of movement of said discs and means to apply pressure to and remove it from said piston, said piston and cylinder being disposed externally to and laterally of the region of said platen and said second disc supporting said mold portions, and pressure means for locking said first disc to said shafts when said mold portions have been closed upon each other and thereupon for applying additional pressure to the region between said two discs and said diaphragm to press said mold portions with greater force against each other during the casting operation and upon completion of the casting to relieve the mold closure pressure, to unlock said first disc from said shafts, and to open said mold.

3. A mold closure mechanism for locking and unlocking two complementary portions of a mold in registering relationship in a molding and casting machine including a frame, comprising a first fixed platen, a second platen movable toward and away from said first platen, means for locking said second platen to said frame of the machine and actuable when said mold portions are closed upon each other, means for mounting on the surface of each of said platens facing the other of said platens one of said two complementary portions of said mold in alignment with the other portion of said mold on the other of said platens, said mounting means being disposed substantially in the central region of said platen surfaces, means for moving said second platen to close said mold portions upon each other and to separate them from each other, said moving means being disposed wholly externally to and laterally of the central region of said facing surfaces of said platens and comprising at least one piston rod affixed to one of said platens, at least one cylinder through one end of which said piston rod extends, means attaching said cylinder to the other of said platens, so that said cylinder is adjustable relative to the said platens to which it is attached in the direction of movement of said movable platen, a piston carried by said piston rod within said cylinder, means for applying pressure to and relieving pressure from the interior of said cylinder, one of said platens consisting of a first and a second disc coaxial with each other and with the other of said platens, said one disc comprising said mounting means for one of said mold portions, said other disc interconnected with the other of said platens by means of said piston and said cylinder of said moving means, a projection from the surface of said first disc facing said second disc, a recess in the surface of said second disc facing said first disc in which said projection slidingly fits, an elastic member sealing the recess region between the end face of said projection and the bottom of said recess, and means for applying pressure to the sealed off recess region to apply high pressure to the closed mold and for relieving the pressure in the sealed-off recess region.

4. A mold closure mechanism for locking and unlocking two complementary portions of a mold in registering relationship in a molding and casting machine, comprising a first platen fixed in said machine, a second platen coaxial with and movable toward and away from said first platen, means for mounting on the surface of each of said platens facing the other of said platens one of two complementary portions of said mold in alignment with the other of said complementary portions of said mold on the other of said platens, said mounting means and said mold portions being disposed substantially in the central region of said platen surfaces, means secured to said second platen for moving said second platen towards said first platen to close said mold portions upon each other and away from said first platen to separate them from each other, said moving means being disposed wholly externally to and laterally of the central regions of the facing surfaces of said platens and comprising at least one piston having a piston rod, the latter being affixed to one of said platens with its longitudinal axis parallel to the direction of movement of said movable platen, at least one cylinder, said piston rod extending through one end of said cylinder and said piston reciprocating in said cylinder, means for securing said cylinder at a point selectively intermediate the ends of the latter to the other of said platens, so that the stroke of said piston in said cylinder permits any predetermined distance between said platens, and means for applying pressure to and relieving pressure from the interior of said cylinder, respectively.

5. A mold closure mechanism for locking and unlocking two complementary portions of a mold in registering relationship in a molding and casting machine, comprising a first platen fixed in said machine, a second platen coaxial with and movable toward and away from said first platen, means for mounting on the surface of each of said platens facing the other of said platens one of two complementary portions of said mold in alignment with the other of said complementary portions of said mold on the other of said platens, said mounting means and said mold portions being disposed substantially in the central region of said platen surfaces, means secured to said second platen for moving said second platen towards said first platen to close said mold portions upon each other and away from said first platen to separate them from each other, said moving means being disposed wholly externally to and laterally of the central regions of the facing surfaces of said platens and comprising at least one piston having a piston rod, the latter being affixed to one of said platens with its longitudinal axis parallel to the direction of movement of said movable platen, at least one cylinder, said piston rod extending through one end of said cylinder and said piston reciprocating in said cylinder, means for securing said cylinder at a point selectively intermediate the ends of the latter to the other of said platens, so that the stroke of said piston permits any predetermined distance between said platens, means for applying pressure to and relieving pressure from the interior of said cylinder, and a plurality of piston rods and cooperating cylinders being disposed at uniformly spaced intervals about the peripheries of said respective platens.

6. A mold closure mechanism for locking and unlocking two complementary portions of a mold in registering relationship in a molding and casting machine, comprising a first platen fixed in said machine, a second platen coaxial with and movable toward and away from said first platen, means for mounting on the surface of each of said platens facing the other of said platens one of said two complementary portions of said mold in alignment with the other of said portions of said mold on the other of said platens, said mounting means and said mold portions being disposed substantially in the central region of said platen surfaces, means secured to said second platen for moving said second platen towards said first platen to close said mold portions upon each other and away from said first platen to separate them from each other, said moving means being disposed wholly externally to and laterally of the central regions of the facing surfaces of said platens and comprising at least one piston having a piston rod, the latter being affixed to one of said platens with its longitudinal axis parallel to the direction of movement of said movable platen, at least one cylinder, said piston rod extending through one end of said cylinder and said piston reciprocating in said cylinder, means for securing said cylinder at a point selectively intermediate its ends to the other of said platens, so that the stroke of said piston in said cylinder permits any predetermined distance between said platens, means for applying pressure to and relieving pressure from the interior of said cylinder, a plurality of spaced shafts supporting said movable platen, latching means at predetermined intervals being operable to latch said movable platen to, and to release it from said shafts, each of said latching means comprising a series of spaced parallel circumferential grooves in the associated one of said spaced shafts, a pair of jaws pivoted at one end to the movable platen and having spaced ribs for entrance into and withdrawal from said shaft grooves, a toggle lever connected to the other end region of each jaw, and hydraulic means connected to the toggle lever for actuating the jaws to closure upon and to release from said shaft.

References Cited in the file of this patent

UNITED STATES PATENTS

| | | |
|---|---|---|
| 1,523,183 | Eckert | Jan. 13, 1925 |
| 1,993,942 | Novotny | Mar. 12, 1935 |
| 2,465,889 | Lester et al. | Mar. 29, 1949 |
| 2,478,657 | Glynn | Aug. 9, 1949 |

FOREIGN PATENTS

| | | |
|---|---|---|
| 796,209 | Great Britain | June 4, 1958 |